United States Patent

Gorsche et al.

[11] 4,236,327
[45] Dec. 2, 1980

[54] WELT

[75] Inventors: Robert D. Gorsche, North Conway; Oscar H. Cloutier, Madison, both of N.H.

[73] Assignee: Jones & Vining, Incorporated, Braintree, Mass.

[21] Appl. No.: 16,290

[22] Filed: Feb. 28, 1979

[51] Int. Cl.³ .................. A43C 13/08; A43B 13/04
[52] U.S. Cl. .............................. 36/14; 36/17 R; 36/32 R; 12/142 RS
[58] Field of Search ......... 36/32 R, 14, 17 R, 17 PW; 12/142 RS

[56] References Cited

U.S. PATENT DOCUMENTS

| 3,070,909 | 1/1963 | Binder et al. | 36/14 |
| 3,147,559 | 9/1964 | Bingham, Jr. | 36/17 R |
| 3,447,251 | 6/1969 | Drexler | 36/14 |
| 3,863,366 | 2/1975 | Auberry et al. | 36/14 |

FOREIGN PATENT DOCUMENTS

| 2331978 | 6/1977 | France | 36/14 |
| 831191 | 3/1960 | United Kingdom | 36/14 |

Primary Examiner—James Kee Chi

[57] ABSTRACT

A unit sole construction, including a sole body of molded, rubbery material, and a welt extending along the body, the welt having an exposed upper wall portion, and a tongue portion extending from the wall portion into the body, the tongue being embedded in the body to secure the welt to the body.

13 Claims, 3 Drawing Figures

U.S. Patent  Dec. 2, 1980  4,236,327
FIG 1
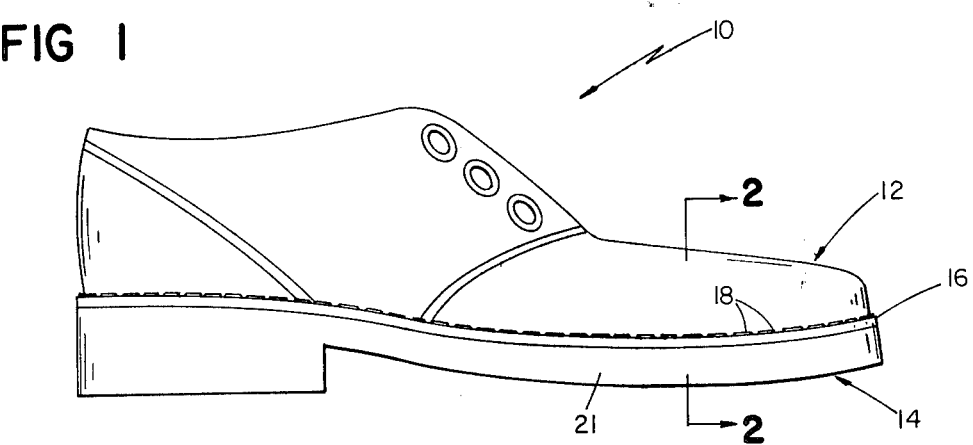
FIG 2
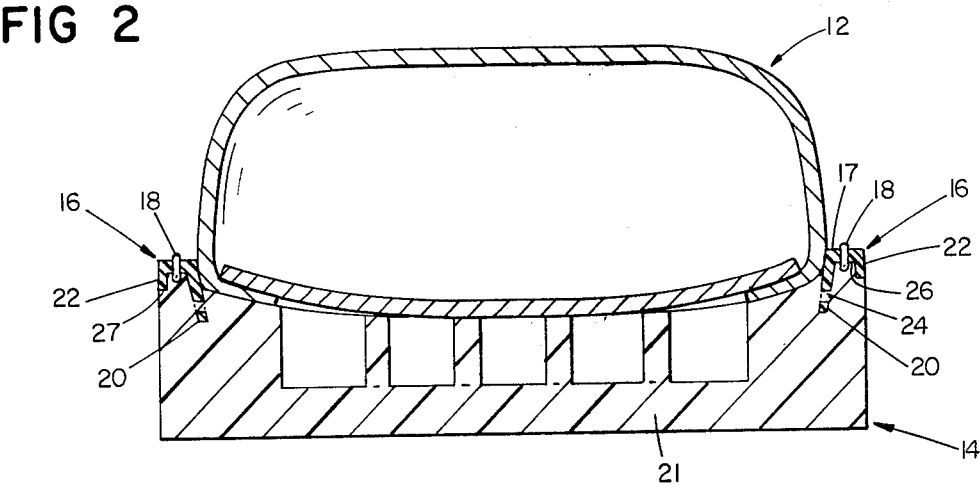
FIG 3

WELT

BACKGROUND OF THE INVENTION

This invention relates to welts on unit shoe soles.

Traditionally, shoe uppers have been stitched to leather soles so as to leave a decorative welt around the periphery of the sole. Today, with the advent of unit soles, uppers are attached to the sole by cement; to preserve the traditional appearance, a separate welt is attached to the unit sole around the periphery of the upper.

Such unit sole welts are typically vinyl strips, often having stitching running the length of the welt, with the bobbin thread running along a stitching groove on the underside of the welt. This stitching groove gives the welt a generally U-shaped cross-section.

A flange is often added to the welt to improve the bond between the welt and unit sole. The welt flange is cemented between the upper and sole. Because such a flange reduces the cement bond area between upper and sole, it is often pinked to reduce its surface area.

SUMMARY OF THE INVENTION

We have discovered that a very strong bond can be obtained between the body of the sole and the welt, without degradation of the upper-to-sole bond, by embedding a tongue portion of the welt in the sole body.

The invention features a unit sole construction, including a sole body of molded, rubbery material, and a welt extending along the perimeter of the body, the welt having an exposed upper wall portion, and a tongue portion extending from the wall portion into the body, the tongue being embedded in the body to secure the welt to the body. In preferred embodiments the tongue extends from the inner periphery of the wall portion and the welt has an exposed flange portion extending from the outer periphery of the wall portion so as to give the welt a J-shaped cross-section, with the flange forming the short leg of the J; the tongue portion has a perforation, and the rubbery material of the body extends into the perforation; the welt has stitching in the wall portion; the welt has adhesive on its surfaces which contact the body; the tongue portion extends at least 0.020 inch from the wall portion; the tongue portion is at least 0.020 inch longer than the flange portion; and the flange portion and the tongue portion extend at least 0.140 inch and 0.320 inch from the wall portion respectively.

The sole construction of my invention is simply manufactured by providing a mold having a groove around its periphery adapted to receive the welt, positioning the welt in the groove, and injecting rubbery material into the mold to form the sole body and embed the tongue of the welt.

PREFERRED EMBODIMENT

We turn now to the structure and manufacture of the preferred embodiment, first briefly describing the drawings thereof.

DRAWINGS

FIG. 1 is a side view of a shoe.

FIG. 2 is a sectional view taken along 2—2 of FIG. 1.

FIG. 3 is a sectional view of a unit sole mold used in the practice of this invention, with welting located as it would be prior to molding.

STRUCTURE

Referring to FIG. 1, shoe 10 has an upper 12, a vinyl unit sole 14, and a vinyl welt 16 of generally J-shaped cross-section.

Turning now to FIG. 2, welt 16 has an upper wall 17 carrying decorative stitching 18, a long inner tongue portion 20 integral with wall 17, and a short outer flange portion 22 also integral with wall 17.

In the embodiment shown, flange 22 and tongue 20 extend down from wall 17, 0.140" and 0.320", respectively. Generally, in preferred embodiments, tongue 20 is at least 0.020" (and most preferably at least 0.040") longer than flange 22.

Flange 20 is embedded in sole body 21 of unit sole 14 and has perforations 24 through which the sole material extends. The vinyl sole material extends into groove 26 between tongue 20 and flange 22 and contacts the underside of stitching 18. Flange 22 thus rests in a rabbet-like notch 27 formed in body 21.

MANUFACTURE

Turning now to FIG. 3, welt 16 is molded in place during the manufacturing of unit sole 14. Mold 28 has a groove 30 around its periphery for welt 16. Welt 16 is coated with adhesive on the surfaces which will contact body 21, and positioned in groove 30. Vinyl sole material is then injected into mold 28.

A very strong bond is thus obtained between the body and the welt, without degradation of the upper-to-sole bond, and with simplicity of construction and manufacture.

OTHER EMBODIMENTS

Other embodiments (e.g., wihout perforations 24; without stitching 18; without adhesive; and without flange 22, in which event tongue 20 is preferably at least 0.020" (and most preferably at least 0.040") long) are within the following claims.

I claim:

1. A unit sole construction, comprising
   a sole body of molded, rubbery material, having a central top surface for receipt of an upper and a peripheral top surface for receipt of a welt, and
   a welt extending along the perimeter of said body, said welt comprising
      an exposed upper wall portion arranged to cover said peripheral top surface of said sole, and
      a tongue portion extending from said wall portion into said body,
         a tongue being embedded in said body so as to be wholly surrounded by said rubbery material to secure said welt thereto prior to attachment of said upper to said surface,
      said welt being free of encroachment onto said central top surface of said sole, so as to avoid reduction of bonding area between said upper and said sole, said welt being free of stitching to said upper.

2. The sole construction of claim 1, wherein said tongue extends from the inner periphery of said wall portion.

3. The sole construction of claim 2 wherein said welt further comprises an exposed flange portion extending from the outer periphery of said wall portion so as to give said welt a J-shaped cross-section with said flange forming the short leg of said J.

4. The sole construction of claim 1 or 3 wherein said tongue portion has a perforation therethrough, and said rubbery material of said body extends into said perforation.

5. The sole construction of claim 1 wherein said welt further comprises stitching in said wall portion.

6. The sole construction of claims 1 or 3 wherein said welt has adhesive on the surfaces thereof in contact with said body.

7. The sole construction of claim 1 wherein said tongue portion extends at least 0.020 inch from said wall portion.

8. The sole construction of claim 3 wherein said tongue portion is at least 0.020 inches longer than said flange portion.

9. The sole construction of claim 8 wherein said flange portion extends at least 0.140 inch from said wall portion.

10. The sole construction of claim 9 wherein said tongue portion extends at least 0.320 inch from said wall portion.

11. A method of manufacturing a unit sole construction, said construction comprising
    a sole body of molded, rubbery material, having a central top surface for receipt of an upper and a peripheral top surface for receipt of a welt, and
    a welt extending along the perimeter of said body, said welt comprising
        an exposed upper wall portion arranged to cover said peripheral top surface of said sole, and
        a tongue portion extending from said wall portion into said body,
        said method comprising the steps of molding said body around said tongue so as to cause said tongue to be wholly surrounded by said rubbery material to secure said welt thereto prior to attachment of said upper to said surface, and
    said welt to be free of encroachment onto said central top surface of said sole, so as to avoid reduction of bonding area between said upper and said sole.

12. The method of claim 11 further comprising the steps of
    providing a mold having a groove around the periphery thereof adapted to receive said welt,
    positioning said welt in said groove, and
    injecting rubbery material into said mold to form said sole body and embed said tongue.

13. The method of claim 12 further comprising the steps of
    providing a mold having a groove around the periphery thereof adapted to receive said welt,
    coating said surfaces of said welt with an adhesive and positioning said welt in said groove, and
    injecting rubbery material into said mold to form said sole body and embed said tongue.

* * * * *